US010726869B2

(12) United States Patent
  Black

(10) Patent No.: US 10,726,869 B2
(45) Date of Patent: Jul. 28, 2020

(54) APPARATUS FOR CHANGING A RECORD, A METHOD OF LOADING A RECORD AND A METHOD OF CHANGING THE SIDE OF A RECORD TO BE PLAYED

(71) Applicant: Sound Leisure Limited, Leeds (GB)

(72) Inventor: Alan Black, Castleford (GB)

(73) Assignee: Sound Leisure Limited, Leeds (GB)

( * ) Notice: Subject to any disclaimer, the term of this patent is extended or adjusted under 35 U.S.C. 154(b) by 0 days.

(21) Appl. No.: 16/481,948

(22) PCT Filed: Feb. 12, 2018

(86) PCT No.: PCT/GB2018/050378
  § 371 (c)(1),
  (2) Date: Jul. 30, 2019

(87) PCT Pub. No.: WO2018/162873
  PCT Pub. Date: Sep. 13, 2018

(65) Prior Publication Data
  US 2020/0043523 A1  Feb. 6, 2020

(30) Foreign Application Priority Data

Mar. 9, 2017 (GB) .................................. 1703817.5

(51) Int. Cl.
  *G11B 17/22* (2006.01)
  *G11B 17/028* (2006.01)
  *G11B 17/056* (2006.01)
(52) U.S. Cl.
  CPC .......... *G11B 17/225* (2013.01); *G11B 17/028* (2013.01); *G11B 17/056* (2013.01)
(58) Field of Classification Search
  CPC .... G11B 17/225; G11B 17/028; G11B 17/056
  (Continued)

(56) References Cited

U.S. PATENT DOCUMENTS

| 3,455,560 A | * | 7/1969 | Tuttle | G11B 19/265 |
| | | | | 369/239 |
| 4,151,572 A | * | 4/1979 | Yamamoto | G11B 23/0321 |
| | | | | 209/554 |

(Continued)

FOREIGN PATENT DOCUMENTS

| GB | 377173 A | 7/1932 |
| JP | S60256962 A | 12/1985 |

(Continued)

OTHER PUBLICATIONS

Great Britain Search Report for Application GB 1703817.5 dated Jul. 24, 2018, 3 pages.

(Continued)

*Primary Examiner* — Allen T Cao
(74) *Attorney, Agent, or Firm* — Howard & Howard Attorneys PLLC

(57) ABSTRACT

An apparatus for changing a record comprising a record changing fork comprising first and second spaced apart tines arranged in a record plane and extending from a fork base to a fork mouth, each tine comprising a groove extending from the fork mouth at least part way to the fork base, the grooves being arranged to hold a record therebetween in the record plane; at least one tine comprising a resiliently deformable record gate, the record gate being adapted to prevent sliding of a record in the grooves past the record gate unless the record is slid with a force exceeding a threshold force; at least one shelf adapted to support a record, the width of the shelf being less than the separation between the tines; and, a control mechanism connected to the record changing fork.

13 Claims, 5 Drawing Sheets

(58) Field of Classification Search
USPC .................................................. 369/191.1
See application file for complete search history.

(56) References Cited

U.S. PATENT DOCUMENTS

| | | | | |
|---|---|---|---|---|
| 4,320,494 A | * | 3/1982 | Lehmann | ............... G11B 19/14 |
| | | | | 369/191.1 |
| 9,633,686 B1 | * | 4/2017 | Altknecht | ............ G11B 17/038 |
| 2009/0143903 A1 | | 6/2009 | Blust et al. | |

FOREIGN PATENT DOCUMENTS

| | | |
|---|---|---|
| JP | H0322253 A | 1/1991 |
| JP | H076481 A | 1/1995 |
| JP | H08339604 A | 12/1996 |
| JP | 3627224 B2 | 3/2005 |

OTHER PUBLICATIONS

International Search Report for Application No. PCT/GB2018/050378 dated Apr. 30, 2018, 3 pages.
English language abstract for JPS 60-256962 extracted from espacenet.com database on Aug. 12, 2019, 1 page.
English language abstract for JPH 03-22253 extracted from espacenet.com database on Aug. 12, 2019, 1 page.
English language abstract for JPH 07-6481 extracted from espacenet.com database on Aug. 12, 2019, 1 page.
English language abstract for JPH 08-339604 extracted from espacenet.com database on Aug. 12, 2019, 1 page.
English language abstract for JP 3627224 extracted from espacenet.com database on Aug. 12, 2019, 1 page.

* cited by examiner

APPARATUS FOR CHANGING A RECORD, A METHOD OF LOADING A RECORD AND A METHOD OF CHANGING THE SIDE OF A RECORD TO BE PLAYED

CROSS-REFERENCE TO RELATED APPLICATIONS

This application is the National Stage of International Patent Application No. PCT/GB2018/050378, filed on Feb. 12, 2018, which claims priority to and all the advantages of United Kingdom Patent Application No. GB 1703817.5, filed on Mar. 9, 2017, the contents of which are incorporated herein by reference.

The present invention relates to an apparatus for changing a record. More particularly, but not exclusively, the present invention relates to an apparatus for changing a record comprising a record changing fork comprising first and second tines for receiving a record therebetween in a record plane, at least of the tines comprising a record gate for preventing sliding of a record in the grooves past the record gate unless done with a force greater than a threshold force, the apparatus further comprising a control mechanism connected to the record changing fork adapted to displace the fork along a length axis from the fork base to the fork mouth and a height axis normal to the record plane. The present invention also relates to a method of loading a record. More particularly, but not exclusively, the present invention relates to a method of loading a record onto the spindle of a turntable comprising the steps of displacing a record changing fork to receive a record on a shelf between the tines of the record changing fork, displacing the record changing fork to lift the record off the shelf and onto the a turntable and then displacing the record changing fork to separate the record changing fork from the record. The present invention also relates to a method of changing the side of a record to be played. More particularly, but not exclusively, the present invention relates to a method of changing the side of a record to be played comprising the steps of displacing a record changing fork to receive a record on a turntable between the tines of the record changing fork, displacing the record changing fork to lift the record from the turntable, rotating the record changing fork about a length axis to invert the record, displacing the record changing fork to lower the record onto the turntable and then displacing the record changing fork to separate the record changing fork from the record.

It is often desired to be able to automatically change the record on the turntable of a record player. This is usually the case where the record player is part of a juke box which plays records. A user makes a record selection. An existing record on the turntable is removed. The selected record is then automatically loaded onto the turntable and played.

Apparatus for automatically loading a record onto a turntable are known. One such apparatus comprises a spike held above the spindle of the turntable. Records are dropped from the spike onto the spindle one after the other as required. Such an apparatus has a number of drawbacks. Firstly the records can only be played in the order they are arranged on the spike. Secondly only one side of each record can be played. Thirdly, once all of the records have been played they must be manually re-loaded onto the spike.

Alternative forms of such apparatus are known. Such apparatus typically comprise grippers having moveable arms. The arms move to grip the record. The two arms then move the record onto the turntable where it is played. Such apparatus tend to be complex, unreliable and difficult and expensive to manufacture.

The present invention seeks to overcome the problems of the prior art.

Accordingly, in a first aspect, the present invention provides an apparatus for changing a record comprising
a record changing fork comprising first and second spaced apart tines arranged in a record plane and extending from a fork base to a fork mouth, each tine comprising a groove extending from the fork mouth at least part way to the fork base, the grooves being arranged to hold a record therebetween in the record plane;
at least one tine comprising a resiliently deformable record gate, the record gate being adapted to prevent sliding of a record in the grooves past the record gate unless the record is slid with a force exceeding a threshold force;
at least one shelf adapted to support a record, the width of the shelf being less than the separation between the tines; and,
a control mechanism connected to the record changing fork, the control mechanism being adapted to reciprocally displace the record changing fork along a length axis extending from the fork mouth to the fork base and a height axis normal to the record plane;
the shelf comprising at least one end stop adapted to prevent sliding of a record off the shelf in a direction parallel to the length axis towards the record changing fork and at least one back stop adapted to prevent sliding of a record off the shelf in a direction parallel to the length axis away from the record changing fork The apparatus for changing a record according to the invention is simple and inexpensive to manufacture. The record changing fork has no moving parts making it reliable and relatively simple to manufacture. The only moving part is the control mechanism which moves the record changing fork between desired positions.

Preferably the apparatus comprises a plurality of shelves

Preferably the first and second spaced apart tines are parallel.

Preferably the record gate comprises a resiliently deformable curved strip arranged within the groove of the tine.

Preferably the record gate is arranged proximate to the fork mouth.

Preferably each tine comprises a record gate.

Preferably the record changing fork is connected to the control mechanism by means of a pivot, the pivot being adapted invert record changing fork about the length axis.

Preferably one of the tines is heavier than the other.

Preferably the apparatus further comprises a turntable, the turntable having a spindle extending therefrom.

Preferably the plane of the turntable is parallel to the record plane.

Preferably the plane of each shelf is parallel to the record plane.

In a further aspect of the invention there is provided a method of loading a record onto a turntable, the turntable comprising a spindle, the method comprising the steps of
(i) providing an apparatus for changing a record as claimed in any one of claims 1 to 11;
(ii) providing a record on the shelf;
(iii) displacing the record changing fork along the length axis towards the record with a force greater than the threshold force to receive the record on the shelf in the grooves;
(iv) displacing the record changing fork along the height axis to lift the record from the shelf;

(v) displacing the record changing fork along both the height and length axes such that the record is received on the spindle; and, (vi) displacing the record changing fork along the length axis away from the record with a force greater than the threshold force to separate the record from the record changing fork.

In a further aspect of the invention there is provided a method of changing the side of a record to be played comprising the steps of (i) providing a turntable comprising a spindle, the turntable having a record thereon received on the spindle;

(ii) providing an apparatus for changing a record as claimed in claim 7;

(iii) displacing the record changing fork along the length axis towards the record with a force greater than the threshold force to receive the record in the grooves;

(iv) displacing the record changing fork along the height axis to lift the record off the spindle;

(v) rotating the record changing fork about the length axis to invert the record;

(vi) displacing the record changing fork along the height axis to lower the record back onto the turntable; and, (vii) displacing the record changing fork along the length axis away from the record with a force greater than the threshold force to separate the record changing fork The present invention will now be described by way of example only and not in any limitative sense with reference to the accompanying drawings in which FIG. 1 shows a record changing fork of an apparatus for changing a record according to the invention;

FIGS. 2(a) and 2(b) show the record changing fork of FIG. 1 in end view;

Figure 1:
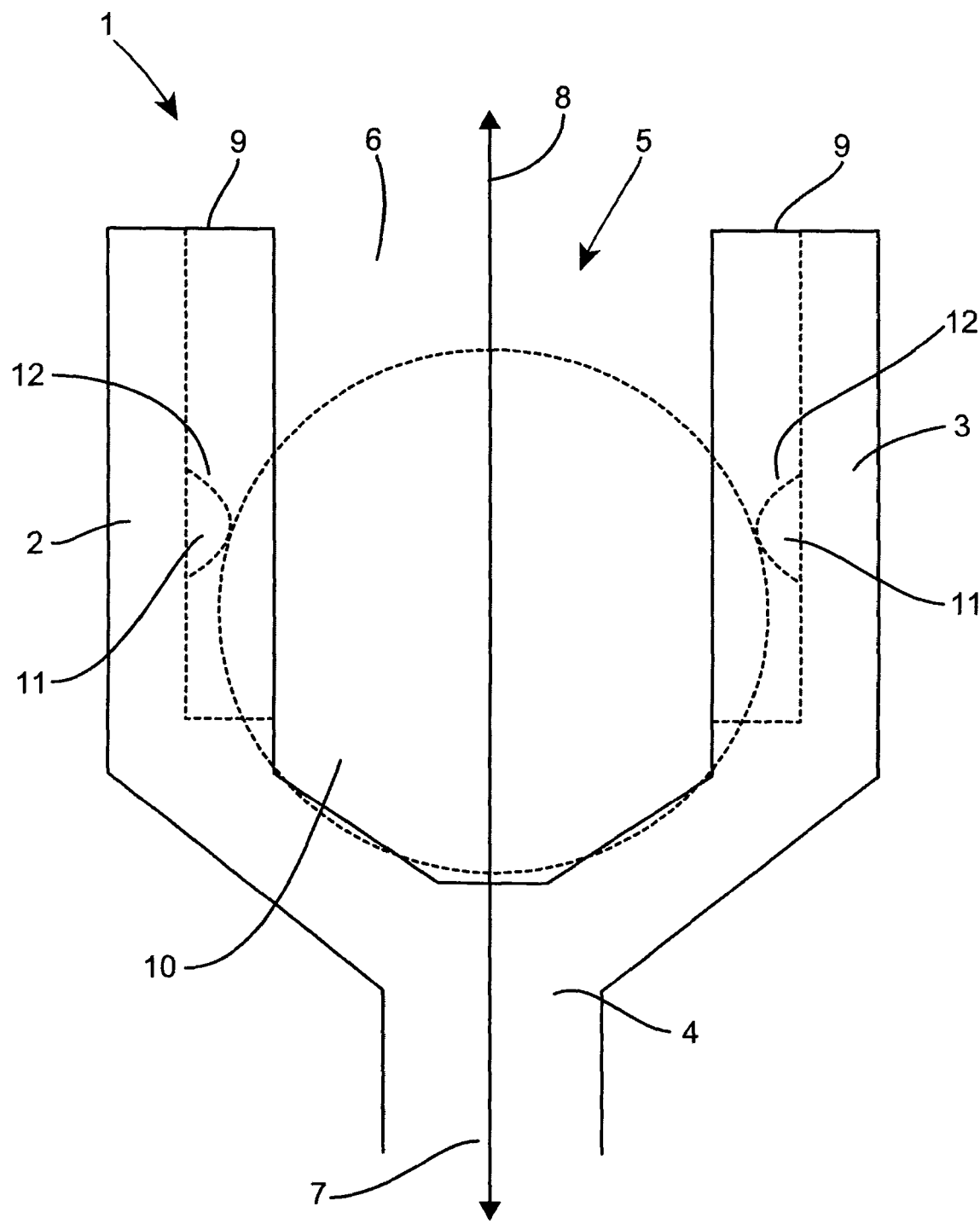

Shown in FIG. 1 is a record changing fork 1 of an apparatus for changing a record according to the invention in plan view. The record changing fork 1 comprises first and second spaced apart tines 2,3. The tines 2,3 are connected together at a fork base 4 and extend to a fork mouth 5. The two tines 2,3 are parallel and arranged in a record plane 6.

A length axis 7 extends from the fork mouth 5 to the fork base 4. In this embodiment the length axis 7 extends from the center of the fork mouth 5 to the center of the fork base 4. The two tines 2,3 extend parallel to the length axis 7. The record changing fork 1 has a mirror symmetry about a symmetry axis 8. The symmetry axis 8 and length axis 7 are coaxial.

Each tine 2,3 comprises a groove 9. Each groove 9 extends from the fork mouth 5 part way to the fork base 4. The grooves 9 are arranged spaced apart and facing each other so as to hold a record 10 therebetween in the record plane 6 as shown.

Each of the tines 2,3 comprises a record gate 11. Each record gate 11 comprises a resiliently deformable curved strip 12, typically a metal strip. Each strip 12 is arranged in a groove 9 and is typically proximate to the fork mouth 5.

In order to load a record 10 into the record changing fork 1 one arranges a record 10 in the record plane 6 proximate to the fork mouth 5. The record 10 is then slid in the record plane 6 along the length axis 7 into the fork mouth 5 where it is received by the grooves 9 and then towards the fork base 4. As the record 10 slides along the grooves 9 it abuts the record gates 11. If the record 10 is slid with a force less than a threshold force the record gates 11 do not deform and so further sliding of the record 10 towards the fork base 4 is prevented. If the record 10 is slid with a force greater than the threshold force then the record gates 11 deform allowing sliding of the record 10 past the record gates 11 and further towards the fork base 4. Similarly, a record 10 can only be unloaded from the record changing fork 1 if it is slid along the grooves 9 along the length axis 7 away from the fork base 4 with a force greater than the threshold force.

Figure 2A:
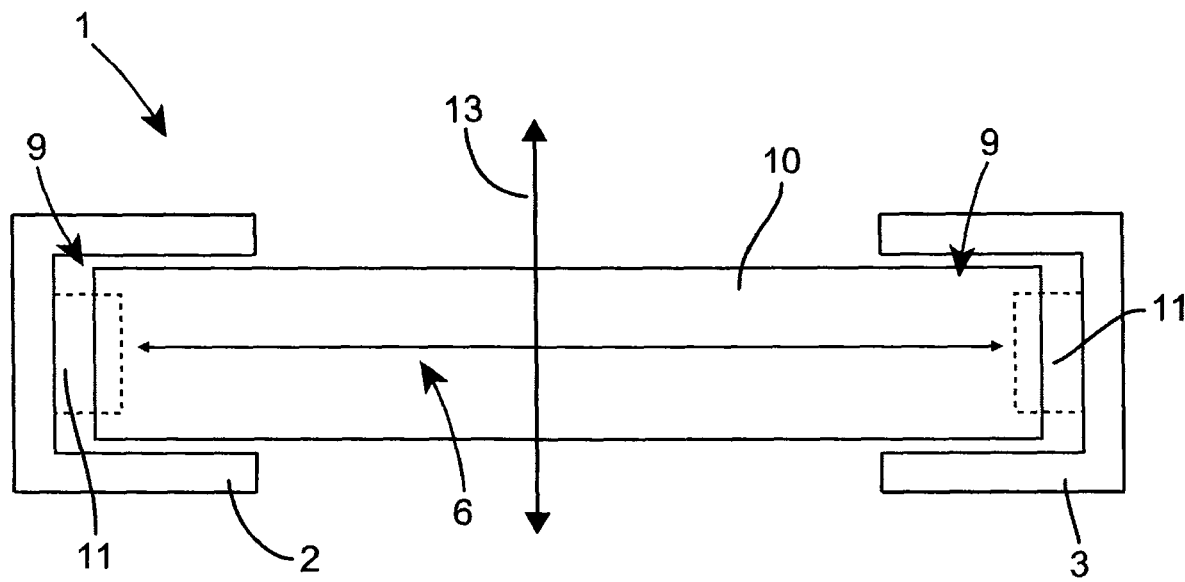

FIG. 2(a) shows the record changing fork 1 of FIG. 1 in end view from the fork mouth 5 towards the fork base 4 along the length axis 7. A record 10 has been inserted into the mouth 5 of the record changing fork 1 and is received in the grooves 9. The record 10 has not been inserted as far as the record gates 11. As can be seen, the separation between the record gates 11 is slightly less than the diameter of the record 10 and so the record 10 cannot pass the record gates 11 towards the fork base 4.

Figure 2B:
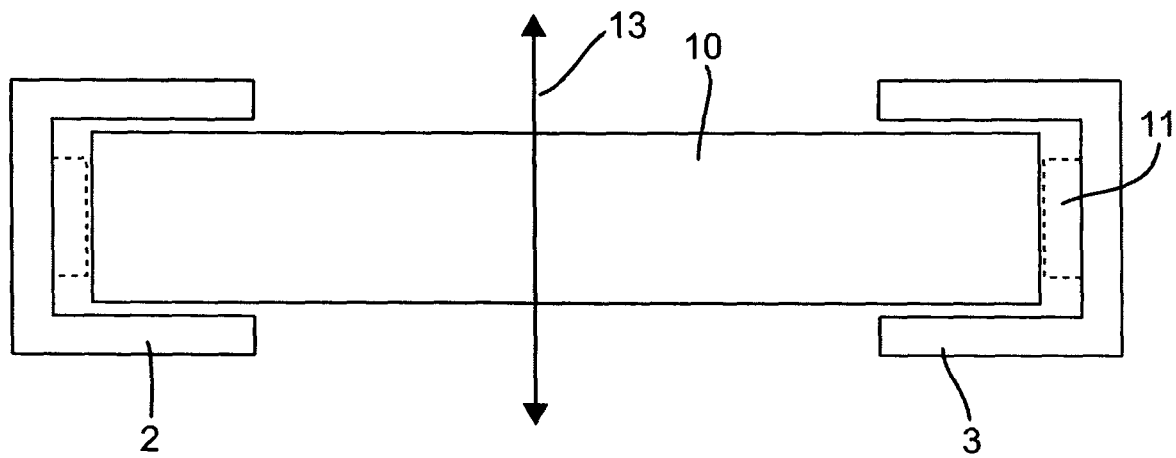

If the record 10 is urged towards the fork base 4 with a force greater than the threshold force the record gates 11 deform as shown in FIG. 2(b). This pushes the record gates 11 apart allowing the record 10 to pass them and towards the fork base 4.

Also shown in FIGS. 2(a) and 2(b) is a height axis 13 which extends normal to the record plane 6.

Figure 3:
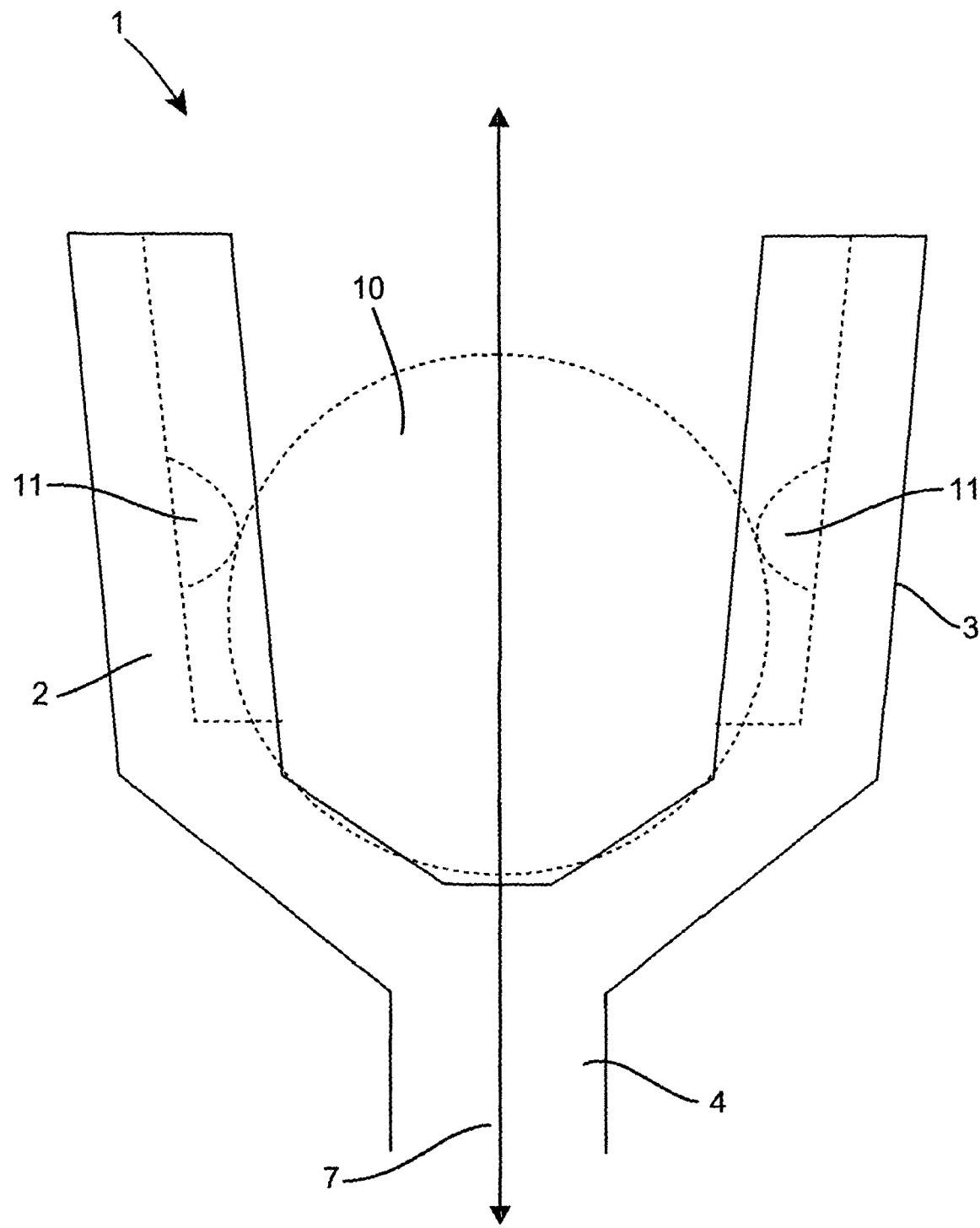
FIG. 3 shows a further embodiment of a record changing fork of an apparatus according to the invention.

Shown in FIG. 3 is a further embodiment of a record changing fork 1 of an apparatus for changing a record according to the invention in plan view. In this embodiment the separation between the tines 2,3 increases in a direction moving away from the fork base 4. This embodiment of the record changing fork 1 is less preferred than that of FIGS. 1 and 2 as only relatively restricted movement of the record 10 along the length direction 7 is possible.

Figure 4:
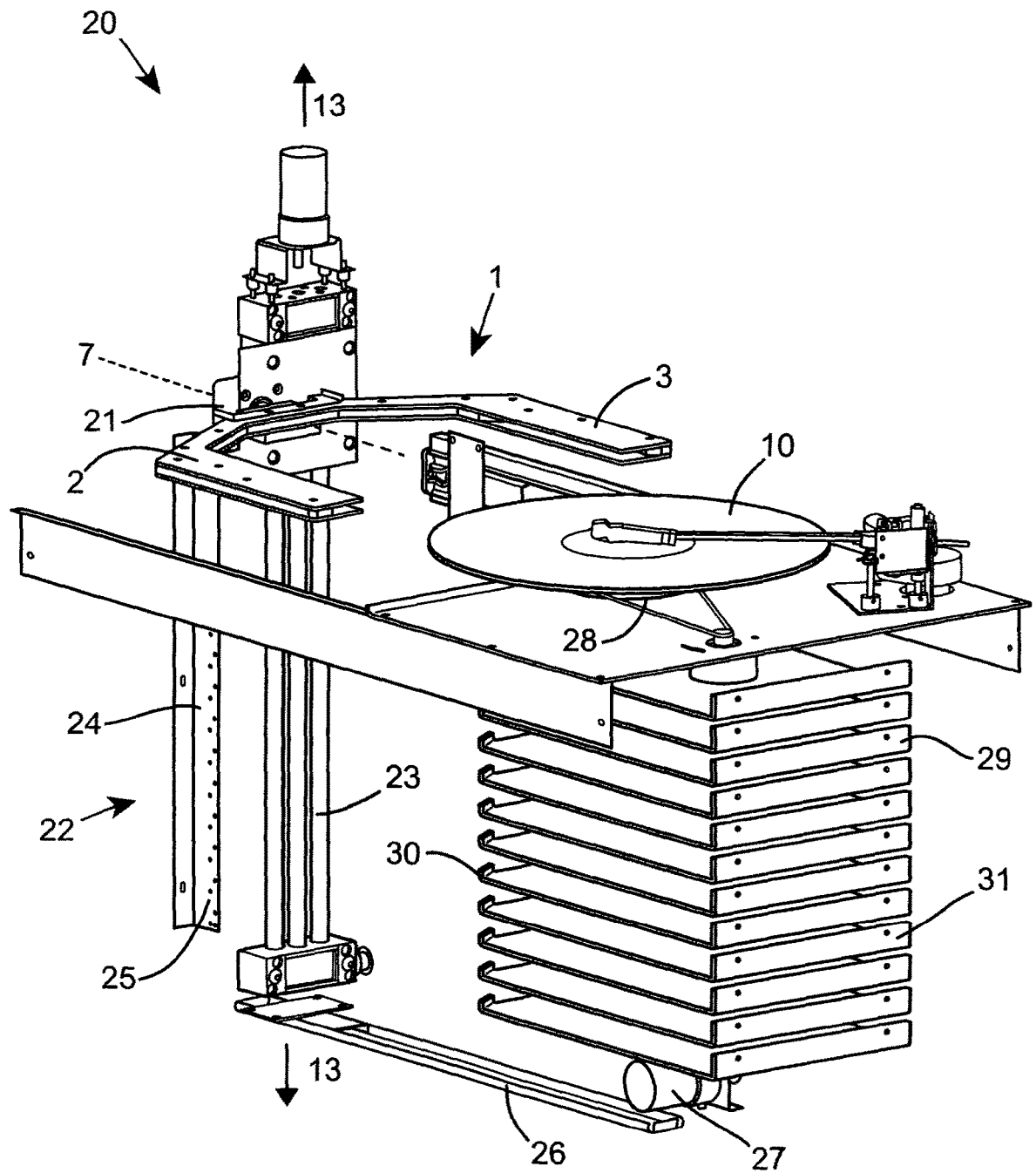
FIG. 4 shows an apparatus for changing a record according to the invention in perspective view.

Shown in FIG. 4 in perspective view is an apparatus 20 for changing a record 10 according to the invention. The apparatus 20 comprises a record changing fork 1 as described with reference to FIGS. 1 and 2. The record changing fork 1 is connected to a pivot 21. The pivot 21 is adapted to pivot about a pivot axis which extends along the length axis 7 of the record changing fork 1. The pivot 21 allows the record changing fork 1 to be rotated through substantially 180 degrees about the pivot axis so inverting the record changing fork 1.

The pivot 21 is in turn connected to a control mechanism 22. The control mechanism 22 comprises a first track 23 along which the record changing fork 1 can be displaced. The first track 23 extends along the height axis 13 normal to the record plane 6 as shown. The control mechanism 22 further comprises a first motor (not shown) for displacing the record changing fork 1 along the first track 23.

Adjacent to the first track 23 and connected thereto is a guide strip 24. The guide strip 24 has a plurality of holes 25 extending therethrough. Connected to the record changing fork 1 is a sensor, typically an optical sensor. The sensor detects when the record changing fork 1 passes a hole as it moves along the first track 23, so enabling the position of the record changing fork 1 along the first track 23 to be determined.

The control mechanism 22 further comprises a second track 26 which extends parallel to the length axis 7 of the record changing fork 1. The control mechanism 22 comprises a second motor 27 which displaces the first track 23 and the guide strip 24 along the second track 26 so moving the record changing fork 1 along the length axis 7.

A controller (not shown) is connected to the first and second motors 27 and also the sensor. The controller issues commands to the first and second motors 27 to move the record changing fork 1 along both the length and height axes 7,13 as required. The controller employs a feedback mechanism connected to the sensor to accurately determine and control the position of the record changing fork 1 along the first track 23.

The apparatus 20 further comprises a turntable 28 having a spindle (not shown) extending therefrom. The plane of the turntable 28 is parallel to the record plane 6.

The apparatus 20 further comprises a plurality of shelves 29 stacked one above the other. The plane of each shelf 29 is parallel to the record plane 6. The width of each shelf 29 is slightly less than the distance between the tines 2,3 of the record changing fork 1 as shown. Accordingly, when a record 10 dimensioned to be received between the grooves 9 of the record changing fork 1 is arranged on a shelf 29 the record 10 overhangs the sides of the shelf 29 slightly. Each shelf 29 comprises one or more end stops 30 which prevent sliding of a record 10 in a direction along the length axis 7 towards the record changing fork 1 off the shelf 29. Each shelf 29 further comprises one or more back tops 31 which prevent the record 10 from being slid off the shelf 29 in a direction along the length axis 7 away from the record changing fork 1.

In use a record 10 is arranged on one or more of the shelves 29. The record changing apparatus 20 typically forms part of a juke box. A user selects a record 10 on one of the shelves 29 to be played by means of a control panel. When the controller receives this selection it loads the chosen record 10 onto the turntable 28. In a first step the controller displaces the record changing fork 1 along the height axis 13 until the record plane 6 is coplanar with the chosen record 10. The record changing fork 1 is then moved forwards along the length axis 7 towards the record 10 until the record 10 is received in the tine grooves 9 at the fork mouth 5. As the record changing fork 1 is moved further forward along the length axis 7 the record 10 is pushed back on the shelf 29 until it abuts the back stop 31 at which point further movement of the record 10 is prevented. The record changing fork 1 is then urged further forward along the length axis 7 towards the record 10 with a force greater than the threshold force so pushing the record 10 past the record gates 11 to the fork base 4.

Once the record 10 is received in the record changing fork 1 the record changing fork 1 is displaced along the height axis 13 lifting the record 10 from the shelf 29 by a distance greater than the height of the stops 30,31. Then, by a combination of movement along the length and height axes 7,13 the record changing fork 1 is displaced to a position proximate to the turntable 28 with the aperture in the center of the record 10 being coaxial with the spindle. The record changing fork 1 is then moved along the height axis 13 lowering the record 10 onto the turntable 28. In a final step the record changing fork 1 is moved along the length axis 7 away from the record 10 with a force greater than the threshold force so separating the record changing fork 1 from the record 10. The spindle holds the record 10 stationary whilst this is performed. The record 10 can then be played.

In order to unload a record 10 from the turntable 28 the steps are essentially reversed. In a first step the record changing fork 1 is displaced along the height axis 13 until the record plane 6 is coplanar with the record 10 on the turntable 28. The record changing fork 1 is then moved along the length axis 7 towards the record 10 with a force greater than the threshold force until the record 10 is received in the record changing fork 1 past the record gates 11. The record changing fork 1 is then displaced along the height axis 13 lifting the record 10 from the turntable 28. In the next step the record changing fork 1 is displaced along both height and length axes 7,13 to lower the record 10 onto one of the shelves 29. In a final step the record changing fork 1 is moved along the length axis 7 away from the shelf 29 with a force greater than the threshold force. Initially the record 10 slides on the shelf 29 until it reaches the end stops 30 after which further movement of the record 10 is prevented. As the record changing fork 1 is moved further along the length axis 7 away from the shelf 29 the record changing fork 1 separates from the record 10.

In order to change a record 10 on the turntable 28 the existing record 10 on the turntable 28 is first unloaded by the method described above. A new record 10 is then loaded onto the turntable 28 again by the method described above.

The apparatus 20 according to the invention can also be employed to change the side of a record 10 to be played. In a first step the record changing fork 1 is displaced along the height axis 13 until the record plane 6 of the record changing fork 1 is coplanar with the record 10 on the turntable 28. The record changing fork 1 is then moved forward along the length axis 7 towards the record 10 with a force greater than the threshold force such that the record 10 is received in the grooves 9 of the record changing fork 1 and urged past the record gates 11. The record changing fork 1 is then displaced along the height axis 13 lifting the record 10 from the turntable 28 and then along the length axis 7 away from the turntable 28. Once the record 10 is a sufficient distance from the turntable 28, the pivot 21 is rotated about the pivot axis inverting the record 10. Typically the pivot 21 includes a motor for rotating the pivot 21. The pivot motor is connected to the controller and the controller sends a signal to the pivot motor to invert the record changing fork 1.

Once the record changing fork 1 has been inverted the record changing fork 1 is moved along the length axis 7 towards the turntable 28 until the aperture in the center of the record 10 is coaxial with the spindle. The record changing fork 1 is then displaced along the height axis 13 lowering the record 10 onto the turntable 28. In a final step the record changing fork 1 is then displaced along the length axis 7 away from the turntable 28 with a force greater than the threshold force so separating the record changing fork 1 from the record 10.

Figure 5A:
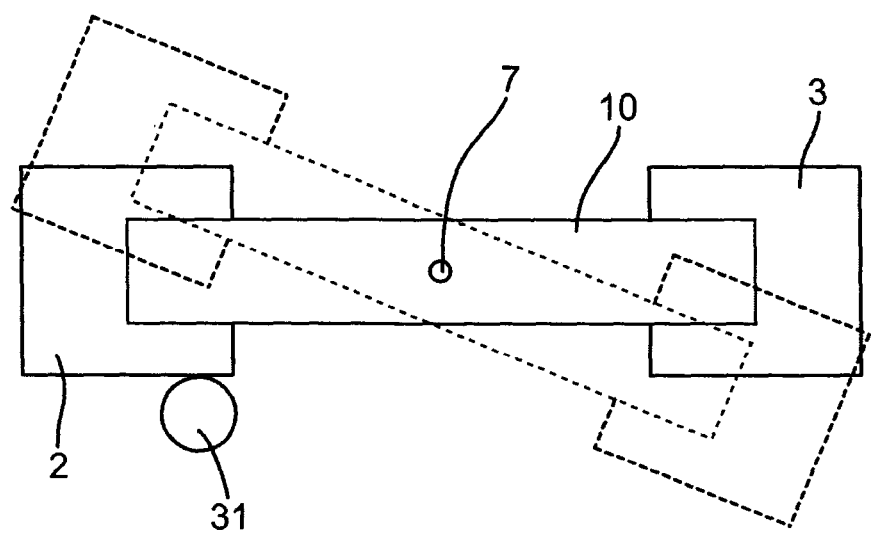
FIG. 5(a) shows the record changing fork viewed along the length axis.

The record changing fork 1 is typically held in the correct horizontal orientation by means of a rotation stop 31 as shown in FIG. 5(a) which shows the record changing fork 1 viewed along the length axis 7. The record changing fork 1 is free to rotate about the length axis 7 as previously described. Because of this vibrations experienced by the apparatus 20 during use may cause the record changing fork 1 to rotate about the length axis 7 (as shown dotted) so that the record plane 6 is no longer parallel to the turntable 28.

Figure 5B:
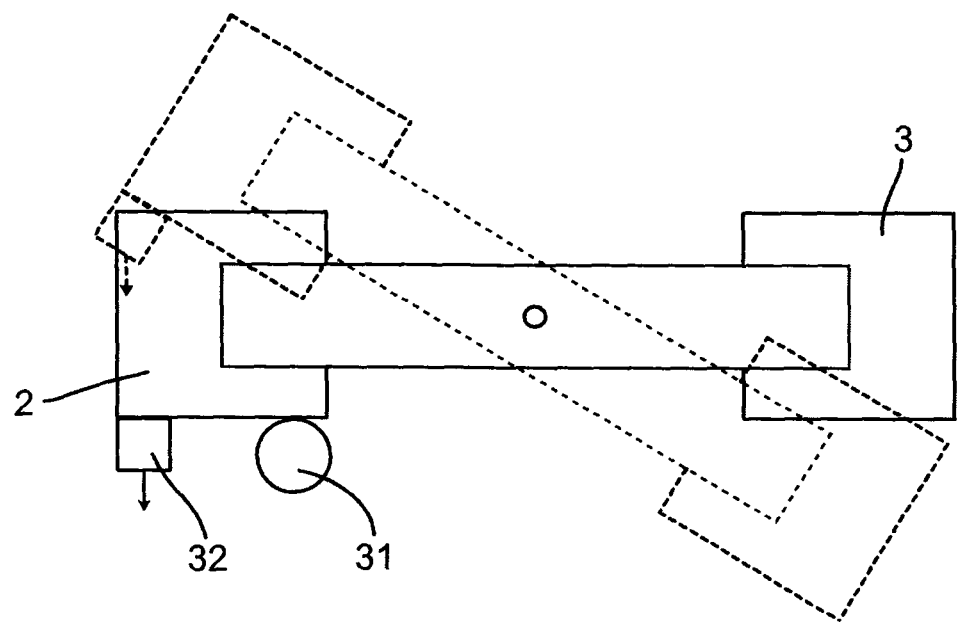
FIG. 5(b) shows an alternative embodiment of a record changing fork viewed along the length axis.

In order to overcome this problem it is preferred that one of the tines 2,3 of the record changing fork 1 is heavier than the other. This is typically achieved by adding a weight 32 to one of the tines 2,3 as shown in FIG. 5(b). In this way if the record changing fork 1 rotates slightly about the length axis 7 then the weight 32 pulls it back to the correct orientation, abutting the rotation stop 31.

In an alternative embodiment of the invention the apparatus 20 lacks a pivot 21. Such an apparatus 20 can be used to load and unload records 10 from the turntable 28 as previously described but cannot be used to invert the record 10.

The invention claimed is:

1. An apparatus for changing a record comprising
a record changing fork comprising first and second spaced apart tines arranged in a record plane and extending from a fork base to a fork mouth, each tine comprising a groove extending from the fork mouth at least part way to the fork base, the grooves being arranged to hold a record therebetween in the record plane;
at least one tine comprising a resiliently deformable record gate, the record gate being adapted to prevent sliding of a record in the grooves past the record gate unless the record is slid with a force exceeding a threshold force;
at least one shelf adapted to support a record, the width of the shelf being less than the separation between the tines; and,
a control mechanism connected to the record changing fork, the control mechanism being adapted to reciprocally displace the record changing fork along a length axis extending from the fork mouth to the fork base and a height axis normal to the record plane;
the shelf comprising at least one end stop adapted to prevent sliding of a record off the shelf in a direction parallel to the length axis towards the record changing fork and at least one back stop adapted to prevent sliding of a record off the shelf in a direction parallel to the length axis away from the record changing fork.

2. An apparatus for changing a record as claimed in claim 1 comprising a plurality of shelves.

3. An apparatus for changing a record as claimed in either of claim 1, wherein the first and second spaced apart tines are parallel.

4. An apparatus for changing a record as claimed in claim 1, wherein the record gate comprises a resiliently deformable curved strip arranged within the groove of the tine.

5. An apparatus for changing a record as claimed in claim 1, wherein the record gate is arranged proximate to the fork mouth.

6. An apparatus for changing a record as claimed in claim 1, wherein each tine comprises a record gate.

7. An apparatus for changing a record as claimed in claim 1, wherein the record changing fork is connected to the control mechanism by means of a pivot, the pivot being adapted invert record changing fork about the length axis.

8. An apparatus for changing a record as claimed in claim 1, wherein one of the tines is heavier than the other.

9. An apparatus for changing a record as claimed in claim 1, further comprising a turntable, the turntable having a spindle extending therefrom.

10. An apparatus for changing a record as claimed in claim 9, wherein the plane of the turntable is parallel to the record plane.

11. An apparatus for changing a record as claimed in claim 1 wherein the plane of each shelf is parallel to the record plane.

12. A method of loading a record onto a turntable, the turntable comprising a spindle, the method comprising the steps of
(i) providing an apparatus for changing a record as claimed in claim 1;
providing a record on the shelf;
(iii) displacing the record changing fork along the length axis towards the record with a force greater than the threshold force to receive the record on the shelf in the grooves;
(iv) displacing the record changing fork along the height axis to lift the record from the shelf;
(v) displacing the record changing fork along both the length and height axes such that the record is received on the spindle; and,
(vi) displacing the record changing fork along the length axis towards the record with a force greater than the threshold force to separate the record from the record changing fork.

13. A method of changing the side of a record to be played comprising the steps of
(i) providing a turntable comprising a spindle, the turntable having a record thereon received on the spindle;
(ii) providing an apparatus for changing a record as claimed in claim 7;
(iii) displacing the record changing fork along the length axis towards the record with a force greater than the threshold force to receive the record in the grooves;
(iv) displacing the record changing fork along the height axis to lift the record off the spindle;
(v) rotating the record changing fork about the length axis to invert the record;
(vi) displacing the record changing fork along the height axis to lower the record back onto the turntable; and,
(vii) displacing the record changing fork along the length axis away from the record with a force greater than the threshold force to separate the record changing fork.

* * * * *

UNITED STATES PATENT AND TRADEMARK OFFICE
CERTIFICATE OF CORRECTION

PATENT NO. : 10,726,869 B2  
APPLICATION NO. : 16/481948  
DATED : July 28, 2020  
INVENTOR(S) : Alan Black Page 1 of 1

It is certified that error appears in the above-identified patent and that said Letters Patent is hereby corrected as shown below:

In the Claims

Column 7, Line 31-32 (in Claim 3): please replace "in either of claim 1," with --in claim 1,--

Signed and Sealed this
Twenty-fourth Day of November, 2020

Andrei Iancu
*Director of the United States Patent and Trademark Office*